United States Patent
Eyraud et al.

(10) Patent No.: US 6,717,420 B2
(45) Date of Patent: Apr. 6, 2004

(54) PLAY MEASURING SENSOR BY MULTIPLE DEPTH ABRASION

(75) Inventors: Jean-Louis Eyraud, Maincy (FR); Franck Patrone, Combs la Ville (FR)

(73) Assignee: Snecma Moteurs, Paris (FR)

( * ) Notice: Subject to any disclaimer, the term of this patent is extended or adjusted under 35 U.S.C. 154(b) by 6 days.

(21) Appl. No.: 10/069,942

(22) PCT Filed: Jun. 28, 2001

(86) PCT No.: PCT/FR01/02051
§ 371 (c)(1),
(2), (4) Date: Aug. 1, 2002

(87) PCT Pub. No.: WO02/03024
PCT Pub. Date: Jan. 10, 2002

(65) Prior Publication Data
US 2003/0020496 A1 Jan. 30, 2003

(30) Foreign Application Priority Data
Jul. 6, 2000 (FR) .............................................. 00 08779

(51) Int. Cl.[7] .............................................. G01R 27/08
(52) U.S. Cl. .................... 324/701; 324/158.1; 324/713; 73/7; 73/116
(58) Field of Search ..................... 73/7, 116; 324/158.1, 324/691, 701, 713, 714, 715, 716, 207.11, 207.25; 83/271

(56) References Cited

U.S. PATENT DOCUMENTS

| 4,063,167 A | * | 12/1977 | Duly ........................... 324/671 |
| 5,119,036 A | * | 6/1992 | Rickards et al. ............ 324/662 |
| 5,760,593 A | | 6/1998 | Lawrence et al. .......... 324/662 |

FOREIGN PATENT DOCUMENTS

BE    854 653    11/1977

\* cited by examiner

Primary Examiner—N. Le
Assistant Examiner—Vincent Q. Nguyen
(74) Attorney, Agent, or Firm—Oblon, Spivak, McClelland, Maier & Neustadt, P.C.

(57) ABSTRACT

A device for measuring a clearance between tips of blades of a ring of blades and an interior wall of a casing surrounding the ring of blades in a turbomachine includes a probe which is mounted radially on the casing. The probe has an end made of a material that can be abraded by the tips of blades as they rotate. The device also includes a printed circuit arranged in a mid-plane of the probe. The probe contains an axis of rotation of the ring of blades. Further, the printed circuit includes a number of adjacent U-shaped electrical circuits that have bases arranged in a probe end likely to be abraded by the tips of blades. The bases lie at different depths from a reference level defining the interior wall of casing. The printed circuit also includes a recognizer for determining which U-shaped electrical circuits have been broken by abrasion and which U-shaped electrical circuits are intact.

6 Claims, 3 Drawing Sheets

US 6,717,420 B2

PLAY MEASURING SENSOR BY MULTIPLE DEPTH ABRASION

BACKGROUND OF THE INVENTION

1. Field of the Invention

The invention relates to a device for measuring the clearance between the tips of the blades of a ring of blades and the interior wall of the casing (5) surrounding said ring of blades in a turbomachine.

2. Discussion of the Background

In the development of turbomachines, knowledge of the blade tip clearances is a fundamental element in mastering the thermodynamics of the machine, so as to improve its performance.

Every effort is made to make this clearance as small as possible, while at the same time avoiding the risk of the blade tips rubbing against the interior wall of the casing.

However, given that it is extremely difficult to optimize this clearance through calculation, because of the many mechanical or thermal parameters involved, it becomes necessary to resort to measuring the clearance between the blade tips and the interior wall of the casing using sensors.

The clearance may be measured continuously in operation. In this case, use is made of sensors of the capacitive type, which give low-amplitude signals.

The clearance may also be measured spot wise during testing or maintenance. In this case, use is generally made of a probe made of an abrasive material which comprises a U-shaped electrical circuit, the base of which is a certain distance from the internal wall of the casing. When the base of the electrical circuit is eroded by abrasion, the electrical circuit opens, the clearance is then smaller than the distance than corresponds to a calibrated depth of clearance. This sensor has the advantage that it is robust, but it gives just one result during the course of the test.

Now, it is often desirable to measure the occurrence of several sites of clearance during the same turbomachine test. To do this, use is made in practice of several sensors of the resistive type at the periphery of the ring of blades, each of which defines a calibrated depth of clearance.

SUMMARY OF THE INVENTION

Starting out from this prior art, the invention set itself the objective of providing provides a simple, reliable and inexpensive device that made it possible to measure several decreasing depths of clearance.

The invention achieves its objective in that the device proposed comprises a probe which can be mounted radially on the casing and at least one end of which is made of a material that can be abraded by the tips of the blades as they rotate, a printed circuit arranged in the mid-plane of said probe which contains the axis of rotation of the ring of blades, this printed circuit comprising a number of adjacent U-shaped electrical circuits the bases of which are arranged in a probe end likely to be abraded by the blade tips and lie at different depths from a reference level defining the interior wall of the casing, and means for recognizing the U-shaped electrical circuits which have been broken by abrasion and the electrical circuits which are intact.

Each base thus corresponds to a calibrated depth of clearance and the device makes it possible, in the course of the one same test, to observe any decrease in clearance, and the position of the blade tips between two calibrated depths.

Implementation of the device entails accurately positioning a single sensor, whereas in the prior art, several sensors each having just one U-shaped electrical circuit, had to be positioned accurately.

To reduce the number of conducting tracks in the printed circuit, two adjacent electrical circuits have a common branch.

Advantageously, the depths of the bases increase by a predetermined step between the shortest lateral electrical circuit and the longest lateral electrical circuit.

To reduce the external wiring of the probe, the outer branch of the shortest lateral electrical circuit is connected to a first electrical terminal, and the other branches of the electrical circuits are connected to a second electrical terminal via a resistor of a set of resistors.

As a preference, the resistors of the set all have practically the same resistance. The terminals are connected to an electrical circuit external to the probe which comprises means for measuring the equivalent impedance of the resistors of the intact circuits. This impedance measurement makes it possible to determine the number of longest circuits broken and thereby the position of the clearance remaining between two calibrated depths of clearance.

BRIEF DESCRIPTION OF THE DRAWINGS

Other advantages and features of the invention will become apparent from reading the following description which is given by way of example and with reference to the appended drawings, in which.

DETAILED DESCRIPTION OF THE PREFERRED EMBODIMENTS

Figure 1:
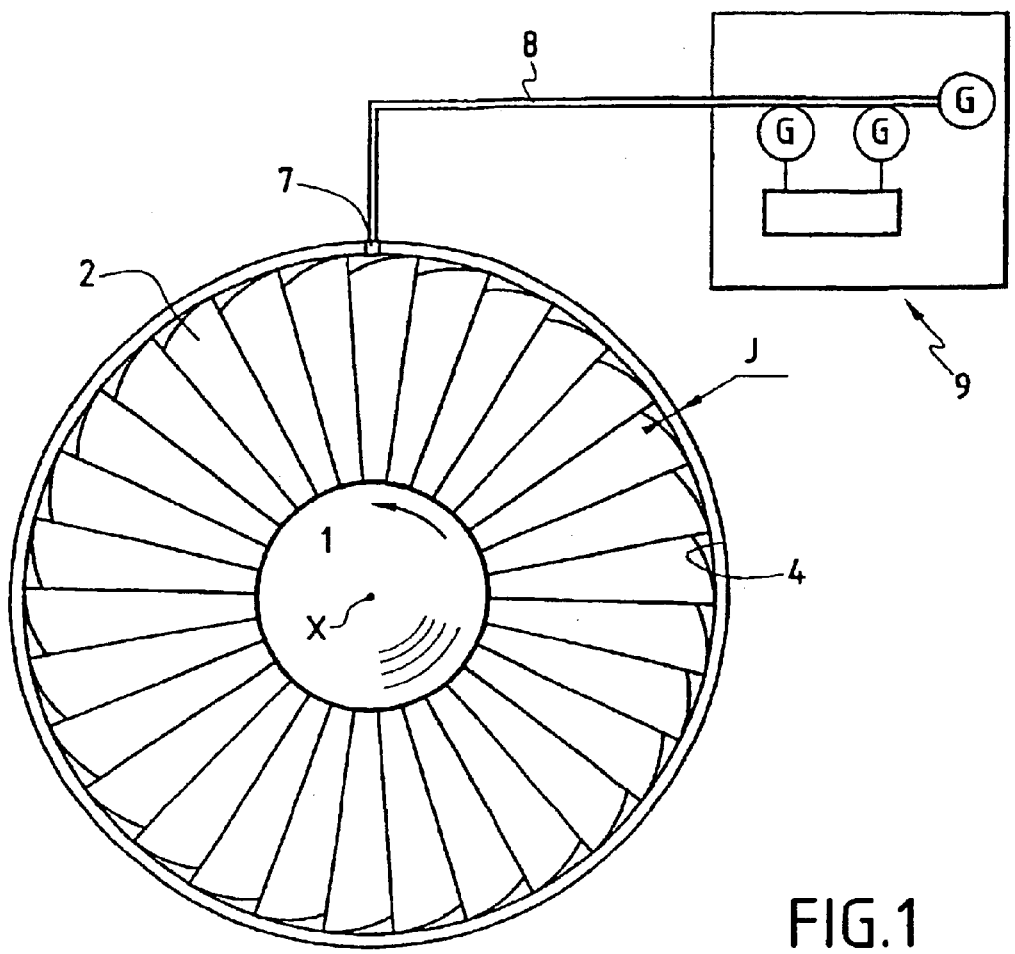
FIG. 1 is a schematic view of the device according to the invention, showing the probe mounted on the casing and the associated measurement means.

FIG. 1 shows an impeller 1 of a turbomachine of axis X, which comprises, at its periphery, a ring of blades 2 the tips 3 of which are arranged a distance J or clearance away from the internal wall 4 of a casing 5 of axis X. Arranged in an orifice 6 of this casing 5 is a probe 7 connected by electrical conductors 8 to a device 9 for measuring the clearance J.

Figure 2:
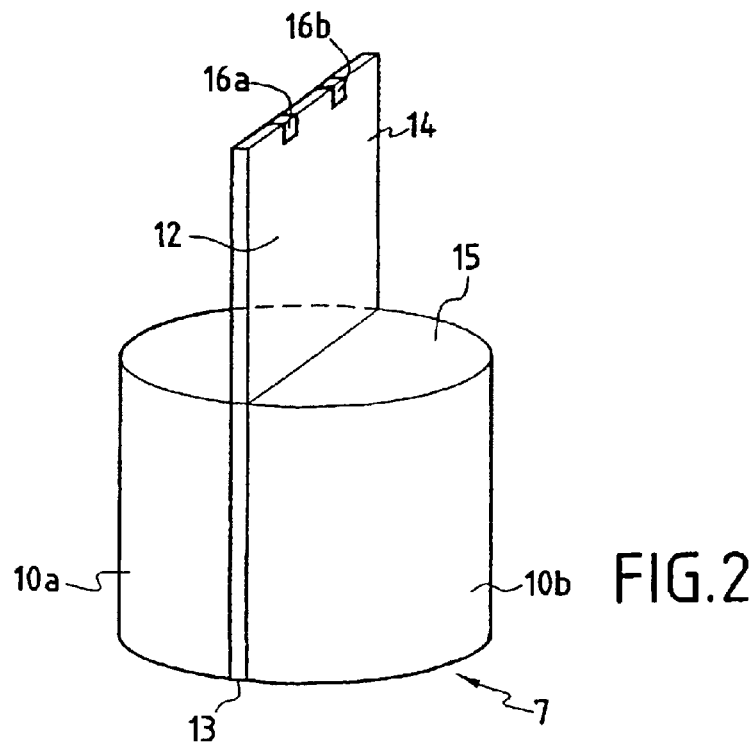
FIG. 2 is a perspective view of the probe.

The probe 7, shown in perspective in FIG. 2, is in the form of a cylindrical body consisting of two half-cylinders 10a, 10b between which a printed circuit 12 is held by bonding or by pressure. The two half-cylinders 10a and 10b are made of a material that can be abraded by the tips 3 of the blades 2, such as Teflon or graphite.

The printed circuit 12 is preferably flexible and possibly multilayer. The lower edge 13 of the printed circuit 12 is arranged in the end face of the probe 7 which is intended to be introduced into the casing 5.

The other end 14 of the printed circuit emerges from the upper face 15 of the probe 7 and in particular comprises the connections and the electrical terminals 16a, 16b for the connecting of the electrical conductors 8.

Figure 3:
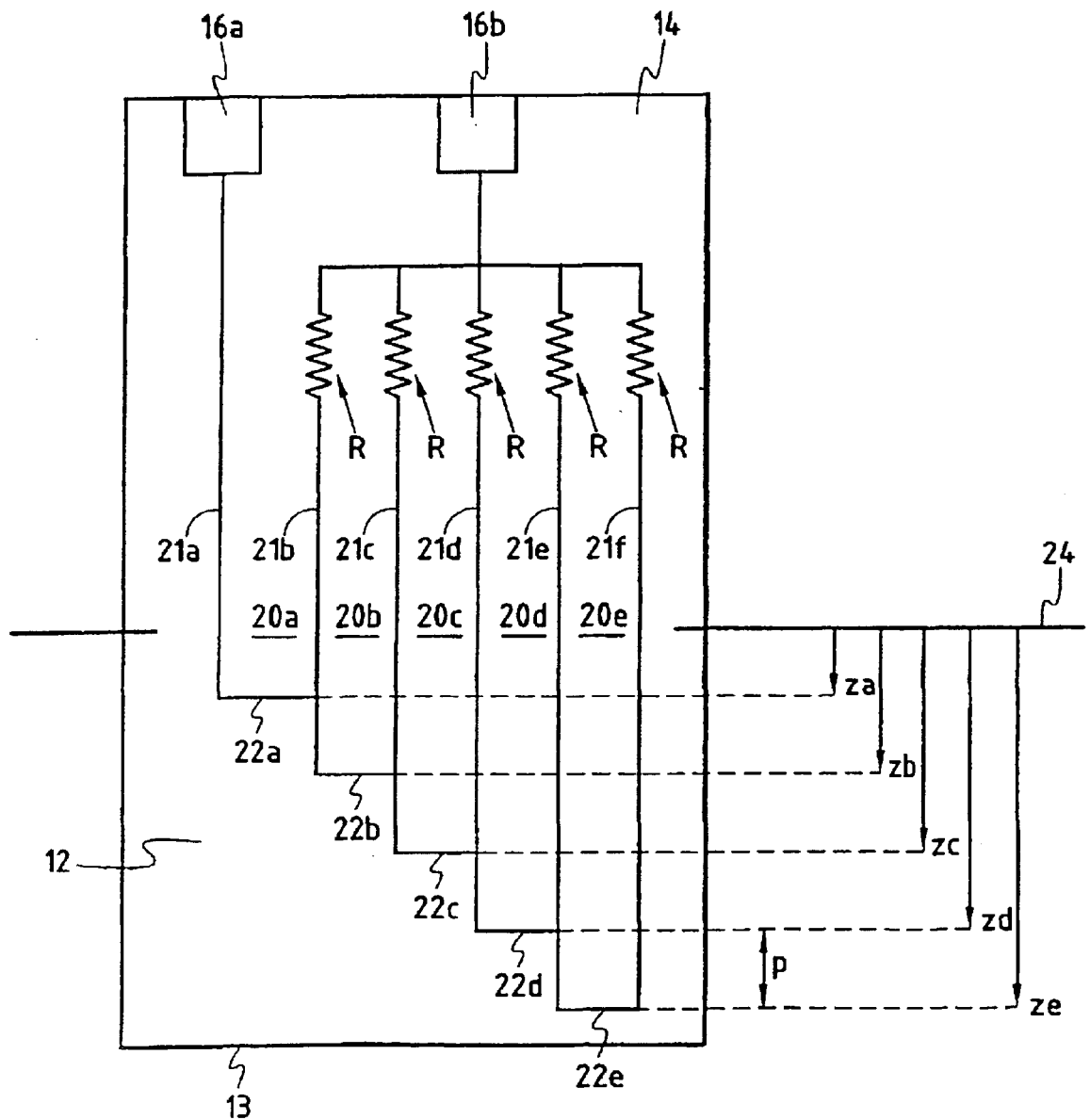
FIG. 3 is a front view of the printed circuit.

The printed circuit 12 comprises a number of adjacent U-shaped electrical circuits 20a to 20e consisting of parallel and vertical conducting branches 21a to 21f of different lengths increasing from left to right, as shown in FIG. 3, and bases 22a to 22e parallel to the edge 13 and offset vertically by a constant step p. Each base connects the lower end of a left-hand branch to the immediately adjacent branch to the right. Each intermediate branch 21b to 21e constitutes an electrical branch for two adjacent electrical circuits.

The outer branch 21a of the shortest electrical circuit 20a is connected to the electrical terminal 16a. The other branches 21b to 21f are connected to the terminal 16b each via a resistor R. As a preference, all the resistors R have the same resistance.

The reference 24 denotes a reference level parallel to the edge 13. Thus, the bases 22a to 22e of the printed circuits 20a to 20e are arranged at respective depths za to ze with respect to the reference level 24.

Figure 4:
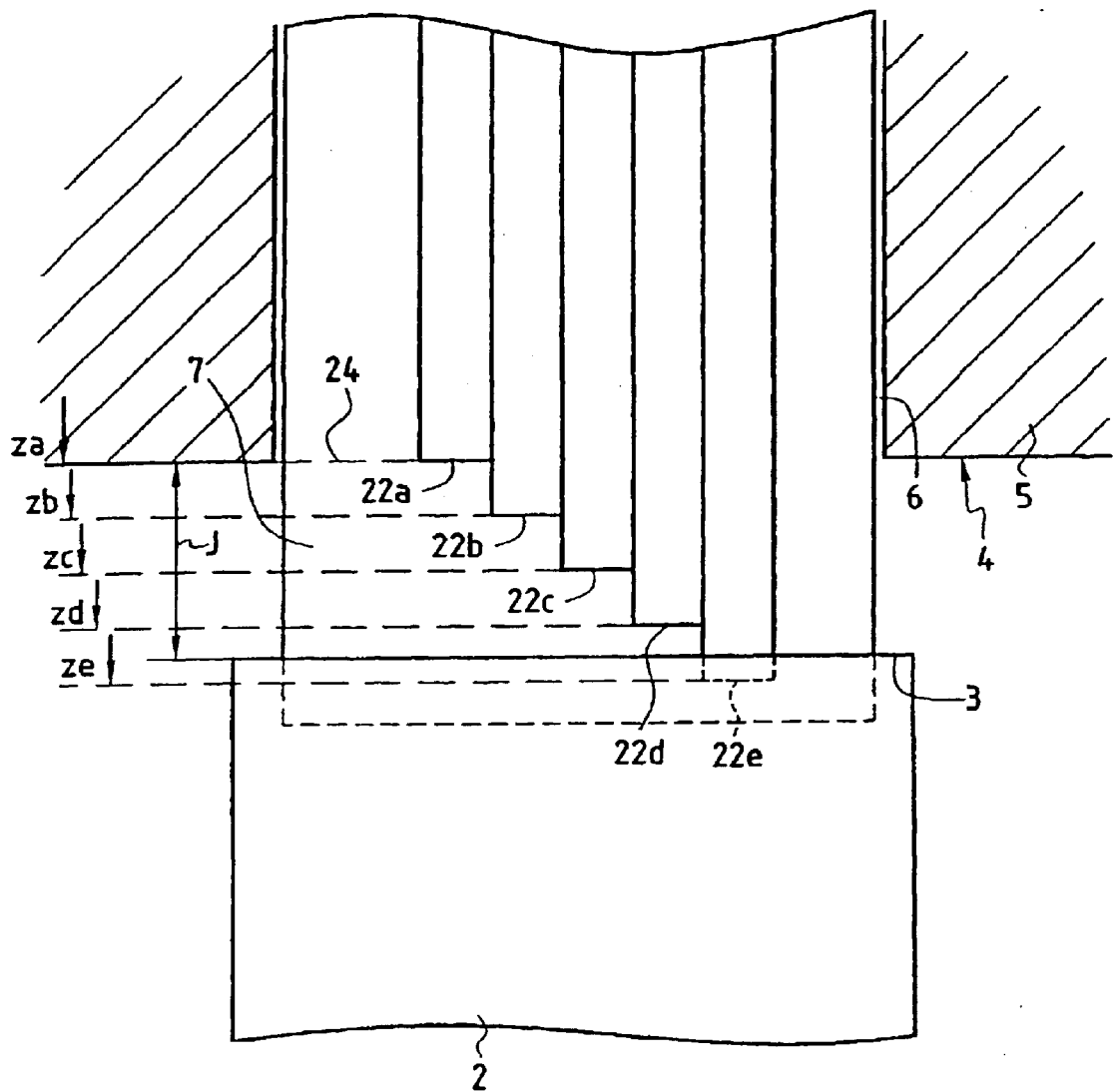
FIG. 4 is a view on the mid-plane of the probe passing through the axis of rotation of the ring of blades and which shows the printed circuit partially abraded by the blade tips.

FIG. 4 shows the arrangement of the probe 7 in the orifice 6 of the casing 5. The base 22a of the electrical circuit 20a is arranged in the plane tangential to the interior wall 4 of the casing 5, by way of example. Thus, the bases 22b to 22e of the other electrical circuits 20b to 20e are spaced away from the interior wall 4 of the casing 5 by a distance respectively equal to p, 2p, 3p and 4p.

If the clearance J is between zd and ze as shown in FIG. 4, then the lower end of the probe 7, showed in dotted line in FIG. 4, is abraded by the end 3 of the blades 2 rotating about the axis X. The branch 22e has been eroded by abrasion. The circuit 20e is therefore broken, and no current can pass through the right-most resistor R of the set visible in FIG. 3.

If, during the turbomachine operating test, the clearance J decreases and falls between zc and zd, then the base 22d will in turn be eroded, and only three resistors R will have current passing through them during the test. The above process is repeated in each of the circuits in the order of their decreasing height as the clearance J is used up.

The resistors R may be produced either in the form of CMS resistors, or in the form of a thick film deposit. The presence of resistors R makes it possible for the probe 7 to be connected to the device 9 for measuring the clearance J by two electrical conductors 8. This measurement device 9 essentially comprises a DC current source G, a voltmeter and ammeter, or more simply an ohmmeter.

The ratio between the voltage measurement V and the current measurement I makes it possible to determine the value of the impedance Z of the network of resistors R during the test and thereby to determine the number of electrical circuits which are intact and the number of electrical circuits which are broken. From this, the position of the tips 3 of the blades 2 with respect to the internal wall 4 of the casing 5 can easily be determined.

What is claimed is:

1. A device for measuring a clearance between tips of blades of a ring of blades and an interior wall of a casing surrounding said ring of blades in a turbomachine, comprising:
    a probe which can be mounted radially on the casing and at least one end of which is made of a material that can be abraded by the tips of blades as they rotate; and
    a printed circuit arranged in a mid-plane of said probe, said probe containing an axis of rotation of said ring of blades,
    wherein the printed circuit comprises a plurality of adjacent U-shaped electrical circuits having bases which are arranged in a probe end likely to be abraded by the tips of blades and lie at different depths from a reference level defining the interior wall of casing, and means for recognizing which U-shaped electrical circuits have been broken by abrasion and which U-shaped electrical circuits are intact.

2. The device as claimed in claim 1, wherein two adjacent U-shaped electrical circuits have a common branch.

3. The device as claimed in claim 2, wherein the depths of the bases increase by a predetermined step between a shortest lateral U-shaped electrical circuit and a longest lateral U-shaped electrical circuit.

4. The device as claimed in claim 3, wherein an outer branch of the shortest lateral U-shaped electrical circuit is connected to a first electrical terminal, and the other branches of the U-shaped electrical circuits are connected to a common second electrical terminal via a respective one of a plurality of resistors.

5. The device as claimed in claim 4, wherein the plurality of resistors have practically the same resistance.

6. The device as claimed in either of claims 4 and 5, wherein said terminals are connected to an electrical circuit external to the probe which comprises means for measuring an equivalent impedance of the resistors of the intact circuits.

* * * * *